(12) United States Patent
Gil (10) Patent No.: US 9,696,947 B1
(45) Date of Patent: Jul. 4, 2017

(54) FAULT IDENTIFICATION FOR A PRINTING SYSTEM

(71) Applicant: Xerox Corporation, Norwalk, CT (US)

(72) Inventor: Alvaro Gil, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/177,406

(22) Filed: Jun. 9, 2016

(51) Int. Cl.
G06F 15/00 (2006.01)
G06F 1/00 (2006.01)
G06K 15/00 (2006.01)
G06F 3/12 (2006.01)
G06N 99/00 (2010.01)
G06N 7/00 (2006.01)

(52) U.S. Cl.
CPC ............ *G06F 3/121* (2013.01); *G06F 3/1234* (2013.01); *G06N 7/005* (2013.01); *G06N 99/005* (2013.01)

(58) Field of Classification Search
CPC ....... G06F 3/121; G06F 3/1234; G06N 7/005; G06N 99/005
USPC .................................................. 358/1.1–1.18
See application file for complete search history.

(56) References Cited

U.S. PATENT DOCUMENTS

| | | | | |
|---|---|---|---|---|
| 6,442,542 B1* | 8/2002 | Ramani | .............. | G01R 31/2846 706/47 |
| 2010/0306249 A1* | 12/2010 | Hill | .................. | G06F 17/30867 707/769 |
| 2013/0304683 A1* | 11/2013 | Lo | ............................ | G06N 3/06 706/20 |

OTHER PUBLICATIONS

Alvaro Gil et al., "Stable Cooperative Surveillance With Information Flow Constraints", IEEE Transactions on Control Systems Technology, vol. 16, No. 5, Sep. 2008, pp. 856-868.
David A. Castanon, Optimal Search Strategies in Dynamic Flyposthesis Testing, IEEE Transactions on Systems, Main and Cybernetics vol. 25, No. 7, Jul. 1995, pp. 1130-1138.
J. W. Sheppard et al., "A Formal Analysis of Fault Diagnosis with D-matrices", Journal of Electronic Testing: Theory and Applications, 2007, Springer Science + Business Media, LLC, pp. 1-14.
Alina Beygelzimer et al., "Test-BAsed Diagnosis: Tree and Matrix Representations", IEEE 2005, pp. 1-14.
Michael Baum et al., "A Search-Theoretic Approach to Cooperative Control for Uninhabited Air Vehicles", AIAA Guidance, Navigation, and Control Conference and Exhibit Aug. 5-8, 2002, Monterey, California, pp. 1-8.

* cited by examiner

*Primary Examiner* — Douglas Tran
(74) *Attorney, Agent, or Firm* — Gibb & Riley, LLC (57) ABSTRACT

A system and method include a printing system with printing modules through which print media is transferred. The printing modules include sensors and a fault detection component. A printing system includes a fault identification system (FIS) and a scheduler. The FIS includes, a machine learning component, a Dependency-matrix component and an optimal search component. The optimal search component repeatedly implements a Rate of Return (ROR) that links the probabilities of occurrences of faults to a priori probabilities of faults and a detection function of the ROR to elements of the D-matrix, determines a ROR value, provides a benefit, and sends one more test to a scheduler of the printing system, which then physically implements the one more test. The prior steps are repeated until a stopping condition is reached and a fault is diagnosed.

20 Claims, 6 Drawing Sheets

FAULT IDENTIFICATION FOR A PRINTING SYSTEM

BACKGROUND

The present application generally relates to printing systems, and more particularly, to identifying faults within printing systems.

Printing systems, which may be referred to as "distributed" or "parallel" or "cluster" printing systems, include several marking engines that are controlled by a control system, which may split a print job among the several marking engines to execute the print job. Each marking engine in the printing system marks print media, e.g., paper, with a marking medium such as ink or toner, where the toner is then fused to the print medium. The marking engines may run at different speeds, print color or monochrome, and/or provide different levels of print quality, where a higher print quality is associated with a higher cost.

In some printing systems, two or more marking engines can each execute a portion of the print job. For example, in duplex printing, one marking engine can print the first side of each sheet of print medium while a second marking engine prints the second side. In simplex printing, two marking engines can print alternate sheets. In some print jobs, e.g., overprinting, two marking engines can apply marking media to the same side of the sheet. A common paper path links two or more marking engines to an output device, such as a finisher, where portions of the executed print job are combined. When a marking engine malfunctions, the control system can reroute the print job, or portion of the print job, while the malfunctioning marking engine is repaired or replaced.

Printing systems with redundant components can provide greater reliability to catastrophic failures of components; however, such redundancy comes at a higher cost of the printing system. In the case of a non-catastrophic failure, a print job can be printed at a lower output speed, or at a higher page cost, or at a lower print quality, depending on the marking engines that are available and operating within acceptable functional parameters, the requirements of other print jobs, and the customer's preferences.

Fault detection results from a binary decision, i.e., either something has gone wrong or everything is fine. Frequently, printing systems rely on fault detection within the individual marking engines. Each marking engine includes sensors that detect and log performance characteristics, such as timing of various events, outputs of feedback control loops, toner properties, voltages and current, developed toner mass on photoreceptors, print quality and registration, color or monochrome values, environmental conditions, actuator values, and the like. A marking engine can detect a fault, which in fact did not originate within the marking engine; instead, the fault may have occurred upstream in the common paper path, for example, in an upstream making engine. Each marking engine reports its detected faults to the control system of the printing system.

Fault identification is a procedure to identify observation values, received from the sensors of the individual marking engines, most relevant to diagnosing a fault. Fault diagnostics is a procedure to determine which fault has occurred, or the cause of the observed value indicating a faulty mode of operation. Fault identification is useful to reconfigure a printing system, so as to operate in the presence of one or more faults, i.e., a fault tolerant system.

SUMMARY

The following summary is provided to facilitate an understanding of some of the innovative features unique to the disclosed systems and methods and is not intended to be a full description. A full description of the various aspects of the systems and methods disclosed herein can be gained by taking the entire specification, claims, drawings, and abstract as a whole.

A system for fault identification herein may include a printing system further including, printing modules through which print media is transferred, where the printing modules include marking engines and sensors to detect faults, a print media conveyor, and a printing system controller including a fault identification system (FIS), a scheduler, a user interface, and a reconfiguration unit. The FIS communicates with the scheduler and the printing system, and the scheduler communicates with the FIS, the user interface, the reconfiguration unit, and the printing system. The FIS includes a machine learning component, a Dependency-matrix (D-matrix) component, and an optimal search component. The machine learning component iteratively maps all real time sensor measurements from all sensors into probabilities of occurrences of the faults. The D-matrix component contains a D-matrix. The optimal search component repeatedly: implements a Rate of Return (ROR) that links the probabilities of occurrences of the faults to a priori probabilities of the independent faults and a detection function of the ROR to elements of the D-matrix; determines a ROR value as one of: an incremental probability of a particular fault being detected by one more particular test; and the incremental probability of the particular fault being detected by the one more particular test divided by an incremental cost of conducting the one more particular test; provides a benefit defined as one of: a maximum ROR value, and a sum of maximum ROR values, over all faults, for any fault being detected by the one more particular test; and sends the one more particular test to the scheduler of the printing system controller. The printing system then physically implements the one more particular test, so as to dynamically reduce a number of tests required to diagnose a fault in the printing system. Finally, the printing system repeats the prior steps of implementing a ROR, determining a ROR value, providing a benefit, sending the one more particular test to the scheduler, and physically implementing the one more particular test, until any of: a number of tests run, a predetermined accumulation of incremental costs, a predetermined benefit is reached, and a fault is diagnosed.

A method for fault identification herein may include: iteratively mapping, in a machine learning component of a printing system controller of a printing system, all real time sensor measurements from all sensors into probabilities of occurrences of faults; constructing, by a D-matrix component of the printing system controller, a D-matrix; implementing a Rate of Return (ROR), by an optimal search component of the printing system controller, that links the probabilities of occurrences of the faults to a priori probabilities of independent faults and a detection function of the ROR to elements of the D-matrix; determining an ROR value, by the optimal search component, defined as one of: an incremental probability of a particular fault being detected by one more particular test; and the incremental probability of the particular fault being detected by the one more particular test divided by an incremental cost of conducting the one more particular test; providing a benefit, by the optimal search component, defined as one of: a maximum ROR value, and a sum of maximum ROR values, over all faults, for any fault being detected by the one more particular test; and sending, by the optimal search component, the one more particular test to the scheduler of the printing system controller. Physically implementing, by the printing system, the one more particular test, so as to dynamically reduce a number of tests required to diagnose a fault in the printing system. Finally repeating the prior steps of implementing a ROR, determining an ROR value, providing a benefit, sending the one more particular test to the scheduler, and physically implementing the one more particular test, until any of: a number of tests run, a predetermined accumulation of incremental costs, a predetermined benefit is reached, and a fault is diagnosed.

A computer program product readable by computer, tangibly embodying a program of instructions executable by the computer to perform a method of fault identification for a printing system, the method comprising: iteratively mapping all real time sensor measurements from all sensors into probabilities of occurrences of faults; constructing a D-matrix; implementing a Rate of Return (ROR) that links the probabilities of occurrences of the faults to a priori probabilities of independent faults and a detection function of the ROR to elements of the D-matrix; determining a ROR value defined as one of: an incremental probability of a particular fault being detected by one more particular test; and the incremental probability of the particular fault being detected by the one more particular test divided by an incremental cost of conducting the one more particular test; providing a benefit defined as one of: a maximum ROR value, and a sum of maximum ROR values, over all faults, for any fault being detected by the one more particular test; and sending the one more particular test to the scheduler of the printing system controller. Physically implementing the one more particular test by the printing system, according to the program of instructions by the computer, so as to dynamically reduce a number of tests required to diagnose a fault in the printing system. Finally, repeating the prior steps of implementing a ROR, determining a ROR value, providing a benefit, sending the one more particular test to the scheduler, and physically implementing the one more particular test, until any of: a number of tests run, a predetermined accumulation of incremental costs, a predetermined benefit is reached, and a fault is diagnosed.

These and other features are described in or are apparent from the following detailed description.

BRIEF DESCRIPTION OF THE DRAWINGS

Various exemplary systems and methods are described in detail below with reference to the attached drawing figures, in which.

DETAILED DESCRIPTION

As stated above, fault identification is useful to reconfigure a printing system, so as to operate in the presence of one or more faults, i.e., a fault tolerant system. This disclosure presents systems and methods for reliably identifying faults in a printing system that carry out as few tests as possible in order to identify the faults.

In an exemplary example of systems and methods herein, a fault identification system (FIS) of the printing system may include: (1) a machine learning component that maps all sensor measurements in real time to probabilities of occurrences of faults; (2) a Dependency-matrix (D-matrix) component that provides a D-matrix; and (3) an optimal search component that repeatedly: implements a Rate of Return (ROR) that links the probabilities of occurrences of the faults to a priori probabilities of independent faults and a detection function of the ROR to elements of the D-matrix; determines a ROR value as one of: an incremental probability of a particular fault being detected by one more particular test; and the incremental probability of the particular fault divided by an incremental cost of conducting the one more particular test; provides a benefit defined as one of: a maximum ROR value, and a sum of maximum ROR values, over all faults, for any fault being detected by the one more particular test; and sends the one more particular test to the scheduler of the printing system controller.

The printing system then physically implement the one more particular test, so as to dynamically reduce a number of tests required to diagnose a fault in the printing system. Finally, the printing system repeats the prior steps of implementing a ROR, determining a ROR value, providing a benefit, sending the one more particular test to the scheduler, and physically implementing the one more particular test, until any of: a number of tests run, a predetermined accumulation of incremental costs, a predetermined benefit is reached, and a fault is diagnosed.

Figure 1:
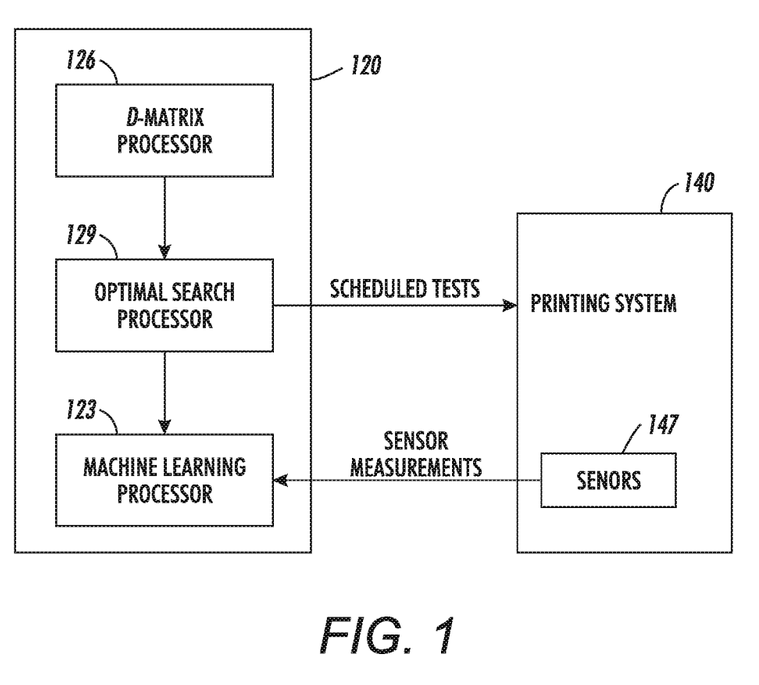
FIG. 1 is a schematic diagram illustrating feedback from the sensors of the marking engines to the fault identification system (FIS) in an exemplary system herein.

FIG. 1 schematically illustrates the feedback from the sensors of the marking engines to the fault identification system (FIS) 120 in an exemplary example of systems and methods herein. Sensors 147 of the printing system 140 provide real time measurements to the FIS 120. The machine learning component 123 maps all the real time sensor measurements into probabilities of occurrences of the faults. The D-matrix matrix component 126 provides a D-matrix corresponding to the components of the printing system 140. The optimal search component 129 repeatedly implements a Rate of Return (ROR), determines a ROR value, provides a benefit, and sends one more test to the scheduler of the printing system 140, until a stopping condition is reached and a fault is diagnosed. The printing system 140 then physically implements the one more test, received from the FIS 120.

A real time measurement, $S_m$, may be obtained from sensor m, where m∈ $\{1, \ldots, M\}$. The operation of the printing system may be associated with a number of operation modes, o, including normal operation modes and faulty operation modes, where o∈$\{1, \ldots, L\}$. A machine learning component of the fault identification system (FIS) may be trained to compute a priori probabilities, P, of fault occurrences o in the printing system and to classify the modes of operation by mapping all the available real time measurement data, $S_m$, into a set of probabilities of the occurrence of all of the operation modes, such that $P(o|S_1, \ldots, S_m)$, which denotes the probability, P, that the mode of operation is o, given the real time measurements from all the sensors, $\{S_1, \ldots, S_m\}$. The methods of classifying modes of operation by mapping to obtain $P(o|S_1, \ldots, S_m)$ for o∈$\{1, \ldots, L\}$ may include any one of the well-known methods of logistic regression, linear discriminant analysis, and classification trees.

An additional step may be included between the real time sensor measurements obtained from each of the plurality of sensors, m, and the classifying of the modes of operation that can result in better performance and/or speed of the classifying of the modes of operation. This additional step may include using Process Control Monitoring to map the real time sensor measurements, Sm, into a lower dimensional space. Alternatively, it is possible to use Principal Component Analysis (PCA) to select components that capture a percentage of the total variation of the original real time sensor measurements, Sm. Subsequently, Hotelling's t-squared or the Squared Prediction Error (SPE) is computed, using the sensor data, and the values of these lower dimensional spaces are used as inputs to classifying the modes of operation.

In the exemplary example of systems and methods herein, the fault identification system (FIS) of the printing system may further include a Dependency matrix (D-matrix) component, where the D-matrix is an $N_Q \times N_F$ matrix with Q rows associated with Q tests, F columns associated with F faults, and elements in the matrix capturing the relationship between tests, related to a query of a sensor measurement, and faults. There are $N_Q$ available tests to perform, and these tests are numbered so that the test space is $Q=\{1, 2, \ldots, N_Q\}$ and there are $N_F$ distinct faults that the system is searching for, where $F=\{1, 2, \ldots, N_F\}$ denotes the set of faults. The element represented by test i and fault j contains the probability distribution $\pi(i|j)$ over the outcomes of test i given that the fault is j. Assume that there are 2 outcomes for each test i, so that the outcome set is $O_u=\{0, 1\}$. More outcomes can easily be incorporated. If the element indexed by test i and fault j in the D-matrix is 0, this indicates the probability that the outcome of test i is 0, given the occurrence of a fault j. This probability may be represented as $\pi(i, m=0|j)$, $j \in F$, $i \in Q$.

TABLE 1

|       | $F_1$ | $F_2$ | $F_3$ | $F_4$ |
|-------|-------|-------|-------|-------|
| $T_1$ | 0     | 0     | 0     | 0     |
| $T_2$ | 0     | 1     | 1     | 1     |
| $T_3$ | 0     | 0     | 1     | 1     |
| $T_4$ | 1     | 1     | 0     | 0     |

Thus, if the second row and third column of the D-matrix shown in Table 1 are examined, above, then it can be seen that the probability that the outcome of test $T_2$ is 1, given that the fault is $F_3$, $\pi(i=T_2|=F_3)=1$.

In the exemplary example of systems and methods herein, the fault identification system (FIS) of the printing system may yet further include search-theoretic Rate of Return (ROR) maps that have relationships between the D-matrix and a method of classifying modes of operation to obtain $P(o|S_1, \ldots, S_m)$ for $o \in \{1, \ldots, L\}$. The optimal search for faults in a printing system may use two methods based on ROR: the payoff of detecting a fault divided by the cost of conducting the test, and the payoff of detecting a fault. Furthermore, the detection strategy may use the particular test where a single fault is most likely to be detected, or to use the test where any fault is most likely to be detected.

As described above, there are $N_Q$ tests, corresponding to queries of sensors to identify modes of normal operation and modes of faulty operation, and $N_F$ distinct faults that the FIS may consider. Due to sensor inaccuracies, a single test may not detect a fault; multiple tests of the same particular type may be needed to detect a fault.

In an exemplary example of systems and methods herein, a Rate of Return (ROR) map may be implemented as follows. The FIS has access to a computed a priori probability, p(j), from the machine learning component that a particular fault occurs when $j \in F$. These probabilities are mutually independent and the faults are distinct when detected; that is, the FIS can identify which fault is detected. Ideally, the sum $\Sigma_{j \in F} p(j)$ links the probabilities $P(o|S_1, \ldots, S_m)$ produced by the method of classifying the modes of operation, to set p(j) into this idealized condition; thus, relating the method of classifying the modes of operation to a search-theoretic ROR map. A measure of the amount of search effort dedicated to test $i \in Q$ of the $N_Q$ tests may be $l_k(i) \in \{0, 1, 2, \ldots \}$, where $l_k(i)$ is the number of tests i performed by time index k. Further, let $a_{j,i}>0$ be a parameter that is proportional to a sensor's determination of a fault, j, when test i is performed. The parameter $a_{j,i}$ may also simulate modes of faulty operation when, for example, tests are not performed and monitored by the same equipment and/or person. The probability that the FIS detects fault j when test i is performed once is $\pi(j|i)$, given that fault j is detected by test i. In addition, it is useful to relate the search effort made by the FIS when searching for a fault, to the probability of detecting a fault. This is done by a detection function, $b(j|i, l_k(i))$, which denotes the conditional probability of detecting fault j when test i is performed by the time index k, given that fault j is detect by test i. If each test i has an independent probability function of finding fault j, then the detection function is:

$$b(j|i,l_k(i))=1-(1-\pi(j|i))^{(a_{j,i}l_k(i))} \quad (1)$$

where $b(j|i, l_k(i))$ may be thought of as the probability that fault $j \in F$ is detected using test $i \in Q$.

Use of probability theory to specify Equation (1) gives $a_{j,i}=1$, but this parameter may sometimes model sensor characteristics. For example, $a_{j,i}>1$ or $a_{j,i}<1$ may correspond to a more or less, respectively, effective sensor. Equation (1) models the common situation with sensor where the probability of detecting a fault increases as the number of tests increases. Higher values of $\pi(j|i)$ and $a_{j,i}$ mean that the sensor is better at detecting a fault using a particular test since fewer tests i are needed to detect a fault. Some tests may be more difficult to implement, while some faults are more difficult to detect. Each of these situations may be quantified with the $\pi(j|i)$ and $a_{j,i}$ parameters.

The payoff for searching for fault j may be defined as $p(j)b(j|i, l_k(i))$, which denotes the probability that fault j will be detected by test i in $l_k(i)$ attempts. The cost for detecting fault j with $l_k(i)$ attempts may be simply defined as $c_j(l_k(i))=c_{j,i}l_k(i)$, where $c_{j,i}>0$ is the cost of running test i to detect fault j. Note that the cost of one attempt of test i to detect fault j is given by $\gamma_j(l_k(i)+1)=(l_k(i)+1)-(l_k(i))=c_{j,i}$.

The probability of failing to detect fault j using test i on the first attempt $l_k(i)$ and succeeding on the next possible attempt $(l_k(i)+1)$, given that fault j is detected by test i, may be given by $\beta_j(l_k(i)+1)$. Thus, the incremental in the probability of test i detecting fault j if one more attempt of test i were conducted is:

$$\beta_j(l_k(i)+1)=b(j|i,l_k(i)+1)-b(j|i,l_k(i)), \quad (2)$$

where $b(j|i, l_k(i)+1)$ represents the detection function computed by time index k when the system performs the one more attempt of test i.

The rate of return (ROR) of test i for fault j may be defined in order to determine a benefit, which the system obtains at time index k, when the one more test i is performed to detect fault j. The ROR, $\rho_j$, is described by the payoff or the incremental probability of fault j being detected by the one more test i, divided by the incremental cost, $\gamma_j$, of conducting the one more test i, i.e., $$\rho_j(l_k(i)+1)=[p(j)\beta_j(l_k(i)+1)]/[\gamma_j(l_k(i)+1)], \quad (3)$$

which yields the ratio of the payoff or the incremental probability to the incremental cost, when $l_k(i)$ attempts for fault j have been performed by test i and the one more test i is to be performed by the system. Clearly, the system would like to place detection efforts in tests where the quantity $\rho_j(l_k(i)+1)$ is largest.

When the system detects a fault j using test i at time index k, the time indexed number of attempts, $l_k(i)$, may be set to zero, i.e., $l_k(i)=0$, re-setting the ROR maps.

Key challenges to the identification of faults include how to use the information on the number of test attempts, and which strategy to use by the system using such information. A strategy may command the system to search for the fault with the maximum ROR map value. The strategy, "use the one more test, where a single fault is most likely to be detected", at time index k may define the one more test as, $$i^*(k)=\arg\max_{j\in F, i\in Q}\{\rho_j(l_k(i)+1)\}, \quad (4)$$

where $i^*(k)\in Q$. To implement this strategy, the system only needs the number of attempts, $l_k(i)$, not the values of maps $\rho_j(l_k(i)+1)$. Thus, the strategy, "use the one more test, where a single fault is most likely to be detected", dynamically reduces the number of tests required to identify a fault in the system.

Another strategy, "use the one more test where any fault is most likely to be detected", at time index k may define the one more test as, $$i^*(k)=\arg\max_{i\in Q}\{\Sigma_{j\in F}\rho_j(l_k(i)+1)\}. \quad (5)$$

Thus, the strategy, "use the one more test where any fault is most likely to be detected", dynamically reduces the number of tests required to identify a fault in the system.

Both strategies are computationally simple. Once the ROR values are computed by Equation (3), either Equation (4) or Equation (5) only requires the computation of the maximum element of $N_Q$ values.

A relationship between the variable $\pi(j|i)$ in the detection function $b(j|i, l_k(i))$ of the ROR maps and the D-matrix, represented by $\pi(i, m=0|j)$, $j\in F$, $i\in Q$, where m denotes the matrix elements of the D-matrix, may use Bayes rule to relate the ROR maps and the D-matrix by the following equation:

$$\pi(j|i,m)=[p(j)\pi(i,m|j)]/[\Sigma_{j\in F}p(j)\pi(i,m|j)]$$

It is useful to take into account all the outcomes for each test i, the equation, above, may be modified to yield, $$\pi(j|i)=\Sigma_{m\in O}[p(j)\pi(i,m|j)]/[\Sigma_{j\in F}p(j)\pi(i,m|j)].$$

Thus, the system may compute the probability $\pi(j|i)$ that the system detects fault j when test i is performed just once, given that fault j is detected by test i using information contained in the D-matrix.

Figure 2:
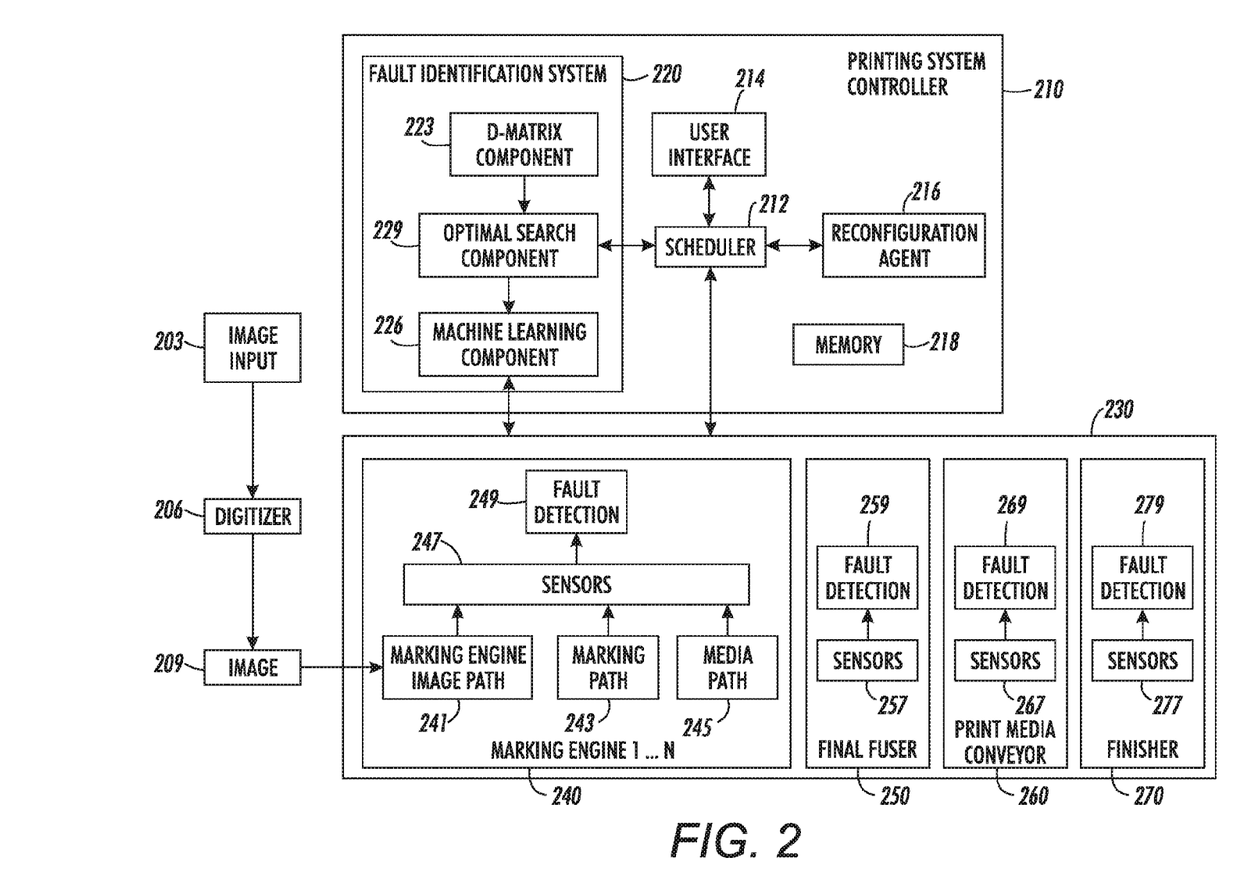
FIG. 2 is a schematic diagram illustrating a printing system controller, including a fault identification system (FIS) that interacts with a printing system to identify faults in an exemplary system herein.

Referring to FIG. 2, an image input device 203 supplies the printing system 230 with one or more print jobs to be printed. The image input device 203 may be a built-in optical scanner, which can be used to scan a document such as book pages, a stack of printed pages, or the like, to create a digital image of the scanned document that is reproduces by printing operations performed by the printing system 230. Alternatively the print job may be electronically delivered to the printing system 230 by a wired or wireless connection to a digital network that interconnects, for example, personal computers, or other digital image devices. The incoming print jobs may be processed by a conventional digitizer 206 having raster image processing and print spooling capabilities. Image data 209 from the digitizer 206 is sent to a selected marking engine or engines for printing according to a schedule determined by the printing system controller 210.

With reference to FIG. 2, an exemplary printing system 230 includes printing modules 240, 250, 260, 270 that detects faults 249, 259, 269, 279 from measurements by sensors 247, 257, 267, 277 and a printing system controller 210, in communication with the printing modules 240, 250, 260, 270.

The printing modules of the printing system 230 include: one or more marking engines, 240; an optional final fuser, 250; a print media conveyor, 260; and an output destination, such as a finisher, 270. The print media conveyor, 260, connects the printing modules 240, 250, and 270.

Providing at least two marking engines 240 provides for enhanced features of the printing system 230, where one marking engine may be a monochrome engine, such as a black (K) marking engine, while another marking engine may be a multi-color, e.g., a process color (P) marking engine. Providing at least two marking engines 240 also allows reconfiguration of the printing system 230, when, for example, a catastrophic fault is identified in one marking engine and the printing system 230 is reconfigured to use another marking engine to complete a print job. Each marking engine 240 includes various subsystems: an image path 241 including components of the marking engine associated with manipulation of the image prior to marking; a marking media path 243 including components of the marking engine associated with forming, transferring and optionally fusing images to print media; and a print media path 245 including components of the marking engine associated with media handling, such as the conveyor system 260, including paper feeder, paper path, and associated drives. Each of the printing modules 240, 250, 260, and 270 includes real time sensors 247, 257, 267, 277 and corresponding fault detection 249, 259, 269, 279 that that may provide preliminary analysis such as time-out checks, threshold checks, trend and rate analysis of output settings between similar units in the printing system 230, checks of actuators and sensor signals for deviation from normal, both in magnitude and frequency. Additionally, fault detection components 249, 259, 269, 279 may include checking fault counters for abnormally high values, or a higher than normal rate of change.

Referring to FIG. 2, the printing controller system 210 includes a number of components that serve to identify faults in the printing modules 240, 250, 260, 270, provide information on the faults to an external user interface 214, and reconfigure the printing system 230 while permanent repairs or replacements, resulting from identified faults, are effected.

In particular the printing system controller includes: a fault identification system (FIS) 220; a scheduler 212 that communicates with the FIS 220, a user interface 214, a reconfiguration agent 216, and a printing system 230, and that determines the appropriate marking engine for a print job and the appropriate printing modules for effecting printing of a page; a user-interface 214 that allows users to input their preferences to the FIS 220, the scheduler 212, and the reconfiguration agent 216; a reconfiguration agent 216 that allows the printing modules 240, 250, 260, 270 to be reconfigured, via the scheduler 212, for a print job when a fault is identified.

The fault identification system (FIS) 220 includes: a memory 218, a machine learning component 226; a Dependency-matrix (D-matrix) component 223, and an optimal search component 229. The machine learning component 226 also communicates with the printing system 230. The D-matrix component 223 and the machine learning component 226 provide inputs to the optimal search component 229. The optimal search component 229 also communicates with the scheduler 212. The Dependency matrix (D-matrix) component 223 operates upon a D-matrix, which is an $N_Q \times N_F$ matrix with Q rows associated with Q tests, F columns associated with F faults, as explained above. The elements of the matrix represent the probability distribution of a particular test, which is related to a sensor measurement(s), given the occurrence of a particular fault.

As explained above, the machine learning component 226 may iteratively map all real time sensor measurements obtained from sensors 247, 257, 267, 277, into probabilities of the occurrences of the faults. The methods of mapping the probabilities of the occurrences of the faults may include any one of the well-known methods of logistic regression, linear discriminant analysis, and classification trees.

An additional step may be included between the real time measurements obtained from each of the plurality of sensors and the mapping of the probabilities of the occurrences of the faults by the machine learning component 226, that results in better performance and/or speed. Process Control Monitoring (PCM), Principal Component Analysis, or factory analysis may be used in this additional step to reduce the original number of real time measurements to low-dimensional components that facilitate training of the mapping of the probabilities of the occurrences of the faults and/or to increase the speed of the mapping of the probabilities of the occurrences of the faults. Further, Hotelling's t-squared or the Squared Prediction Error (SPE) may be computed, using the sensor data, and the computed values may be used as additional inputs to increase the accuracy of mapping of the probabilities of the occurrences of the faults.

As explained above, a strategy selected by a user may command the optimal search component 229 of the printing system controller 210 to search for the fault with the maximum Rate of Return (ROR) map value. As explained above, the optimal search component 229 using Bayes rule may relate the probability distribution $\pi(i, m|j)$ from the D-matrix to the variable $\pi(j|i)$ and the detection function $b(j|i, l_k(i))$ of the ROR maps. One strategy to maximize the ROR map value is to "use one more test, where a single fault is most likely to be detected", at time index k, which may be defined as, $$i^*(k) = \arg\max_{j \in F, i \in Q} \{\rho_j(l_k(i)+1)\}.$$

Alternatively, another strategy to maximize the ROR map value is to "use one more test where any fault is most likely to be detected", at time index k, which may be defined as, $$i^*(k) = \arg\max_{i \in Q} \{\Sigma_{j \in F} \rho_j(l_k(i)+1)\}.$$

Both strategies are computationally simple. As explained above, once the ROR values are computed by Equation (3), either Equation (4) or Equation (5) only requires the computation of the maximum element of $N_Q$ values.

The optimal search component 229 may provide the maximum probability for one of "use the one more test where a single fault is most likely to be detected" and "use the one more test where any fault is most likely to be detected," to send the one more test corresponding to the selected maximum probability to the scheduler 212 for implementation by the printing system 230, so as to dynamically reduce a number of tests required to identify a fault in the printing system.

Figure 3:
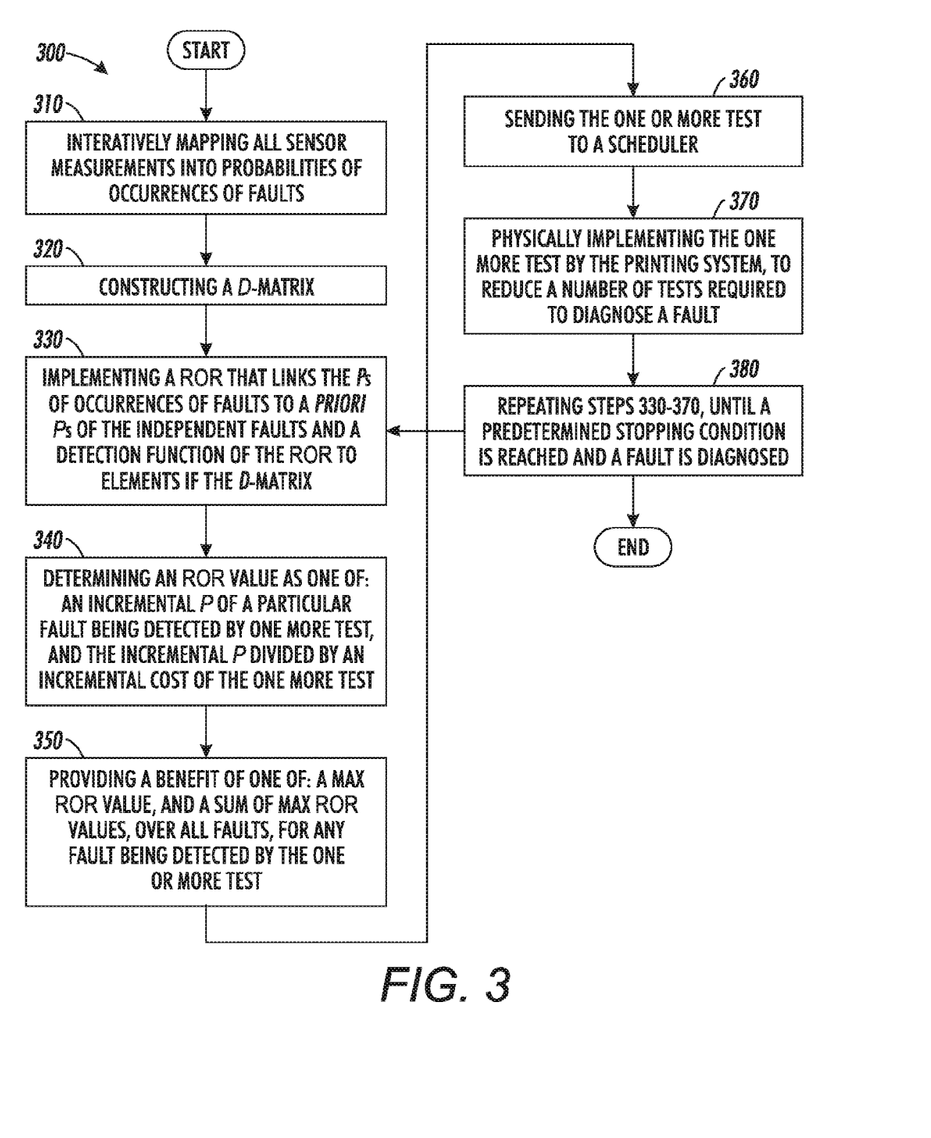
FIG. 3 is a flow chart illustrating a method of fault identification in a printing system that dynamically reduces a number of tests required to diagnose a fault in an exemplary method herein.

FIG. 3 illustrates a flowchart 300 for a method for fault identification of a printing system. The method may include iteratively mapping, in a machine learning component of a printing system controller of a printing system, all real time sensor measurements from all sensors into probabilities of occurrences of faults, 310. The method may also include constructing, by a D-matrix component of the printing system controller, a D-matrix, 320. The method may further include implementing a Rate of Return (ROR), by an optimal search component of the printing system controller, that links the probabilities of occurrences of the faults to a priori probabilities of independent faults and a detection function of the ROR to elements of the D-matrix, 330. The method may yet further include determining an ROR value, by the optimal search component, defined as one of: an incremental probability of a particular fault being detected by one more particular test; and the incremental probability of the particular fault being detected by the one more particular test divided by an incremental cost of conducting the one more particular test, 340. The method may yet further include providing a benefit, by the optimal search component, defined as one of: a maximum ROR value, and a sum of maximum ROR values, over all faults, for any fault being detected by the one more particular test, 350. The method may yet further include sending, by the optimal search component, the one more particular test to the scheduler of the printing system controller, 360. The method may include physically implementing, by the printing system, the one more particular test, so as to dynamically reduce a number of tests required to diagnose a fault in the printing system, 370. Finally, the method may yet further include repeating, by the optimal search component, the prior steps of implementing a ROR, determining an ROR value, providing a benefit, sending the one more particular test to the scheduler, and by the printing system, physically implementing the one more particular test, until any of: a number of tests run, a predetermined accumulation of incremental costs, a predetermined benefit is reached, and a fault is diagnosed, 380.

It will be appreciated that the above-disclosed systems and methods and other features and functions, or alternatives thereof, may be desirably combined into many other different systems or applications including, but not limited to: Heating, Ventilating, and Air Conditioning (HVAC) systems; electro-mechanical manufacturing systems; and vehicle aircraft health monitoring.

Figure 4:
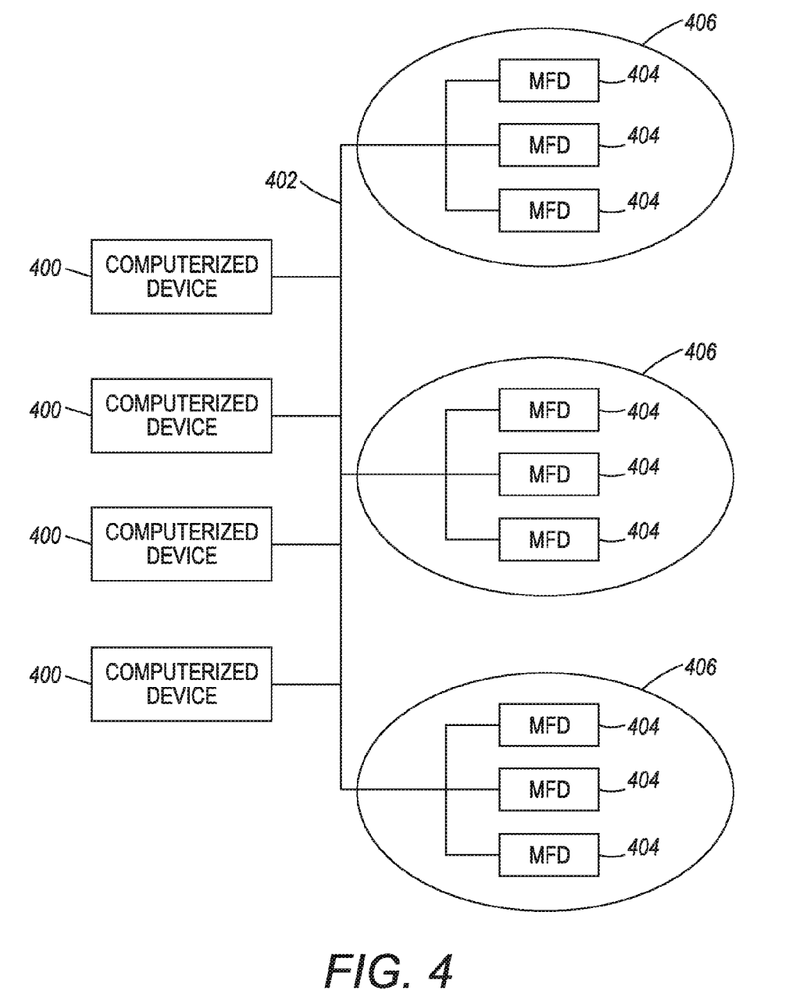
FIG. 4 is a schematic diagram illustrating an exemplary system herein.

As shown in FIG. 4, exemplary systems and methods herein include various computerized devices 400, 404 located at various different physical locations 406. The computerized devices 400, 404 can include print servers, printing devices, personal computers, etc., and are in communication (operatively connected to one another) by way of a local or wide area (wired or wireless) network 402.

Figure 5:
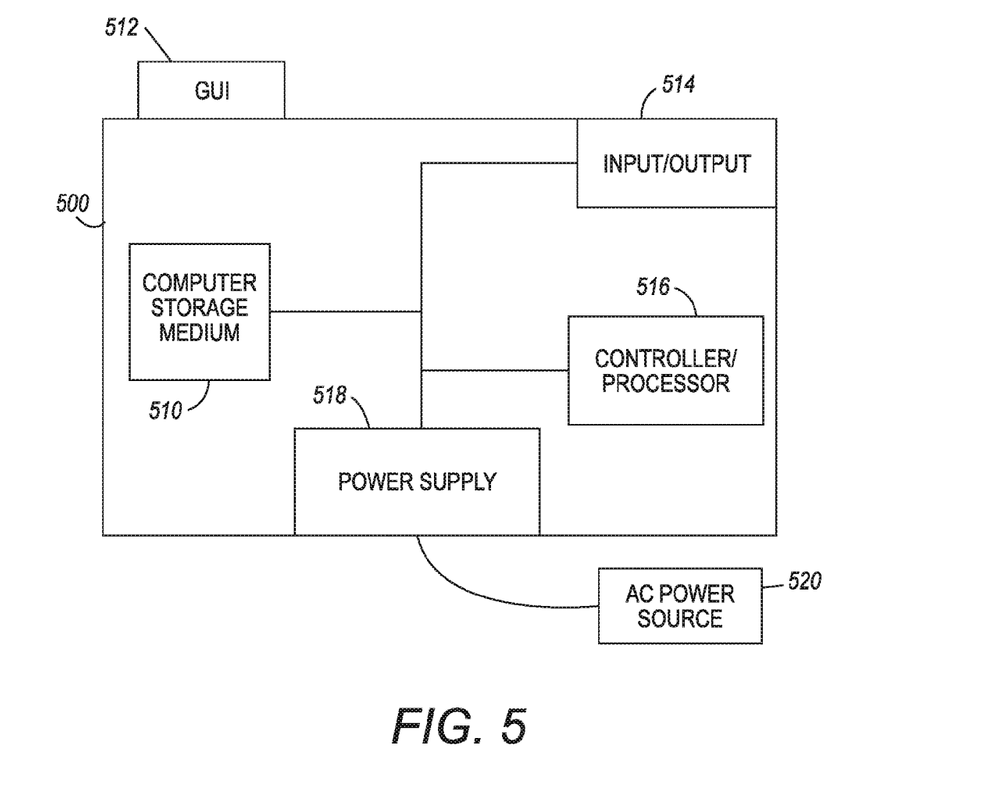
FIG. 5 is a schematic diagram illustrating an exemplary device herein.

FIG. 5 illustrates a computerized device 500, which can be used with systems and methods herein and can comprise, for example, a print server, a personal computer, a portable computing device, etc. The computerized device 500 includes a controller/tangible processor 516 and a communications port (input/output) 514 operatively connected to the tangible processor 516 and to the computerized network external to the computerized device 500. Also, the computerized device 500 can include at least one accessory functional component, such as a graphical user interface (GUI) assembly 512. The user may receive messages, instructions, and menu options from, and enter instructions through, the graphical user interface or control panel 512.

The input/output device 514 is used for communications to and from the computerized device 500 and comprises a wired device or wireless device (of any form, whether currently known or developed in the future). The tangible processor 516 controls the various actions of the computerized device. A non-transitory, tangible, computer storage medium device 510 (which can be optical, magnetic, capacitor based, etc., and is different from a transitory signal) is readable by the tangible processor 516 and stores instructions that the tangible processor 516 executes to allow the computerized device to perform its various functions, such as those described herein. Thus, as shown in FIG. 5, a body housing has one or more functional components that operate on power supplied from an alternating current (AC) source 520 by the power supply 518. The power supply 518 can comprise a common power conversion unit, power storage element (e.g., a battery, etc), etc.

The hardware described herein plays a significant part in permitting the foregoing method to be performed, rather than function solely as a mechanism for permitting a solution to be achieved more quickly, (i.e., through the utilization of a computer for performing calculations).

As would be understood by one ordinarily skilled in the art, the processes described herein cannot be performed by a human alone (or one operating with a pen and a pad of paper) and instead such processes can only be performed by a machine (especially when the volume of data being processed, and the speed at which such data needs to be evaluated is considered). For example, if one were to manually attempt to perform the classification processing performed by the machine learning component discussed above, the manual process would be sufficiently inaccurate and take an excessive amount of time so as to render the manual fault identification results useless. Specifically, processes such as receiving electronic data streams from printing components and sensors, updating automated processes, using the processes to automatically determine which fault test to perform, etc., requires the utilization of different specialized machines, and humans performing such processing would not produce useful results because of the time lag, inconsistency, and inaccuracy humans would introduce into the results.

Also, the data transmitted between the sensors, printing components, processor(s) etc., is integral with the process performed by the methods herein, and is not mere post-solution activity, because the testing processes of the methods herein rely upon the electronic transmissions from sensors and printing components, and cannot be performed without such electronic transmissions. In other words, these various machines are integral with the methods herein because the methods cannot be performed without the machines (and cannot be performed by humans alone).

Additionally, the methods herein solve many highly complex technological problems. For example, as mentioned above, conventional fault identification systems perform many unnecessary tests. Methods herein solve this technological problem by reliably identifying faults in a printing system that carry out as few tests as possible in order to identify the faults. This reduces the amount of electronic storage that a provider must maintain, and also reduces the down time of the equipment, saves power and other resources by not performing unnecessary tests, etc. By granting such benefits to providers, the methods herein reduce the amount and complexity of hardware and software needed to be purchased, installed, and maintained by providers, thereby solving a substantial technological problem that providers experience today.

Figure 6:
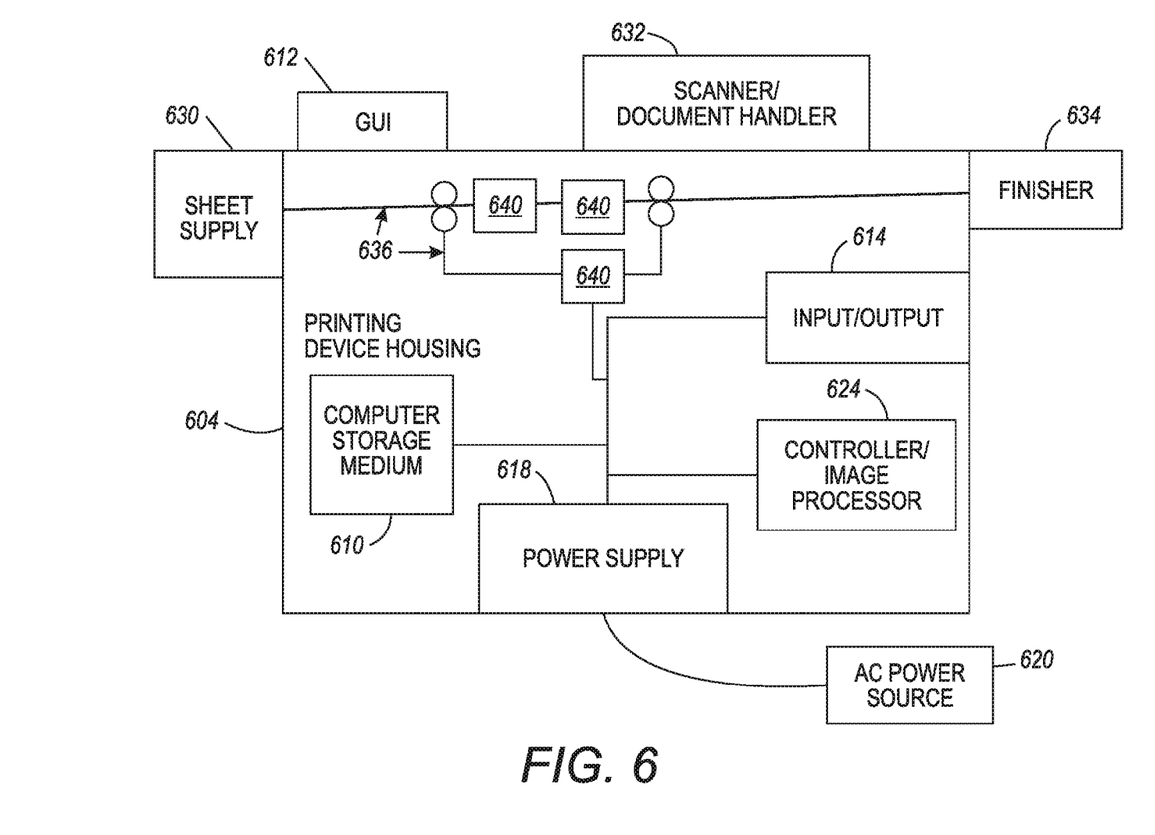
FIG. 6 is a schematic diagram illustrating an exemplary device herein.

FIG. 6 illustrates many components of printer structures 604 herein that can comprise, for example, a printer, copier, multi-function machine, multi-function device (MFD), etc. The printing device 604 includes a controller/tangible processor 624 and a communications port (input/output) 614 operatively connected to the tangible processor 624 and to a computerized network external to the printing device 604. Also, the printing device 604 can include at least one accessory functional component, such as a graphical user interface (GUI) assembly 612. The user may receive messages, instructions, and menu options from, and enter instructions through, the graphical user interface or control panel 612.

The input/output device 614 is used for communications to and from the printing device 604 and comprises a wired device or wireless device (of any form, whether currently known or developed in the future). The tangible processor 624 controls the various actions of the printing device 604. A non-transitory, tangible, computer storage medium device 610 (which can be optical, magnetic, capacitor based, etc., and is different from a transitory signal) is readable by the tangible processor 624 and stores instructions that the tangible processor 624 executes to allow the computerized device to perform its various functions, such as those described herein. Thus, as shown in FIG. 6, a body housing has one or more functional components that operate on power supplied from an alternating current (AC) source 620 by the power supply 618. The power supply 618 can comprise a common power conversion unit, power storage element (e.g., a battery, etc), etc.

The printing device 604 includes at least one marking device (printing engine(s)) 640 that use marking material, and are operatively connected to a specialized image processor 624 (that is different than a general purpose computer because it is specialized for processing image data), a media path 636 positioned to supply continuous media or sheets of media from a sheet supply 630 to the marking device(s) 640, etc. After receiving various markings from the printing engine(s) 640, the sheets of media can optionally pass to a finisher 634 which can fold, staple, sort, etc., the various printed sheets. Also, the printing device 604 can include at least one accessory functional component (such as a scanner/document handler 632 (automatic document feeder (ADF)), etc.) that also operate on the power supplied from the external power source 620 (through the power supply 618).

The one or more printing engines 640 are intended to illustrate any marking device that applies marking material (toner, inks, plastics, organic material, etc.) to continuous media, sheets of media, fixed platforms, etc., in two- or three-dimensional printing processes, whether currently known or developed in the future. The printing engines 640 can include, for example, devices that use electrostatic toner printers, inkjet printheads, contact printheads, three-dimensional printers, etc. The one or more printing engines 640 can include, for example, devices that use a photoreceptor belt or an intermediate transfer belt or devices that print directly to print media (e.g., inkjet printers, ribbon-based contact printers, etc.).

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system, comprising:
    a printing system further comprising printing modules through which print media is transferred, the printing modules including marking engines and sensors to detect faults, and a print media conveyor; and
    a printing system controller comprising a fault identification system (FIS), a scheduler, a user interface, and a reconfiguration unit,
    the FIS being in communication with the scheduler and the printing system,
    the scheduler being in communication with the FIS, the user interface, the reconfiguration unit, and the printing system,
    the FIS comprising a machine learning component, a Dependency-matrix (D-matrix) component, and an optimal search component,
    the machine learning component iteratively mapping all real time sensor measurements from all sensors into probabilities of occurrences of the faults;
    the D-matrix component constructing a D-matrix;
    the optimal search component:
        implementing a Rate of Return (ROR) that links the probabilities of occurrences of the faults to a priori probabilities of independent faults and a detection function of the ROR to elements of the D-matrix;
        determining a ROR value defined as one of: an incremental probability of a particular fault being detected by one more particular test; and the incremental probability of the particular fault being detected by the one more particular test divided by an incremental cost of conducting the one more particular test;
        providing a benefit defined as one of: a maximum ROR value, and a sum of maximum ROR values, over all faults, for any fault being detected by the one more particular test; and
        repeating the prior steps of implementing the ROR, determining the ROR value, and providing the benefit, until one of: a number of tests run, a predetermined accumulation of incremental costs, and a predetermined benefit is reached, and then sending the one more particular test to the scheduler of the printing system controller; and
    the printing system physically implementing the one more particular test, so as to dynamically reduce a number of tests required to detect a fault in the printing system.

2. The system of claim 1, the printing modules further comprising a final fuser that fuses images to print media and includes sensors and a fault detection component.

3. The system of claim 1, further comprising an image input device, a digitizer that digitizes the images from the image input device, and a resulting image from the digitizer that is sent to the printing system.

4. The system of claim 1, the probabilities of occurrences of the faults representing a probability distribution of a particular test related to at least one sensor, given an occurrence of a particular fault.

5. The system of claim 1, the machine learning component using one of: Process Control Monitoring (PCM) to map real time sensor measurements into a lower dimensional space, and Principal Component Analysis (PCA) to select components that capture a percentage of a total variation of real time sensor measurements, to iteratively map the probabilities of occurrences of the faults.

6. The system of claim 1, the D-matrix comprising matrix elements, where each matrix element contains a probability distribution over disjoint outcomes of a particular test and a particular fault.

7. The system of claim 1, the optimal search component implementing the ROR by relating the probabilities of occurrences of the faults to a priori probabilities of the faults by one of: logistic regression, linear discriminant analysis, and classification trees.

8. The system of claim 7, the optimal search component applying Bayes rule to relate matrix elements of the D-matrix to a probability distribution of a particular fault, given a particular test, to provide a detection function of the particular fault used to determine the ROR value.

9. A method, comprising:
iteratively mapping, in a machine learning component of a printing system controller of a printing system, all real time sensor measurements from all sensors into probabilities of occurrences of faults;
constructing, by a D-matrix component of the printing system controller, a D-matrix;
implementing a Rate of Return (ROR), by an optimal search component of the printing system controller, that links the probabilities of occurrences of the faults to a priori probabilities of independent faults and a detection function of the ROR to elements of the D-matrix;
determining an ROR value, by the optimal search component, defined as one of: an incremental probability of a particular fault being detected by one more particular test; and the incremental probability of the particular fault being detected by the one more particular test divided by an incremental cost of conducting the one more particular test;
providing a benefit, by the optimal search component, defined as one of: a maximum ROR value, and a sum of maximum ROR values, over all faults, for any fault being detected by the one more particular test;
repeating, by the optimal search component, the prior steps of implementing the ROR, determining the ROR value, and providing the benefit, until one of: a number of tests run, a predetermined accumulation of incremental costs, and a predetermined benefit is reached, and then sending the one more particular test to a scheduler of the printing system controller; and
physically implementing, by the printing system, the one more particular test, so as to dynamically reduce a number of tests required to detect a fault in the printing system.

10. The method of claim 9, the probabilities of occurrences of the faults representing a probability distribution of a particular test related to at least one sensor, given an occurrence of a particular fault.

11. The method of claim 9, further comprising using one of: Process Control Monitoring (PCM) to map real time sensor measurements into a lower dimensional space, and Principal Component Analysis (PCA) to select components that capture a percentage of a total variation of real time sensor measurements, to iteratively map the probabilities of occurrences of the faults.

12. The method of claim 9, the D-matrix comprising matrix elements, where each matrix element contains a probability distribution over disjoint outcomes of a particular test and a particular fault.

13. The method of claim 9, further comprising implementing the ROR by relating the probabilities of occurrences of the faults to a priori probabilities of the faults by one of: logistic regression, linear discriminant analysis, and classification trees.

14. The method of claim 13, further comprising applying Bayes rule to relate matrix elements of the D-matrix to a probability distribution of a particular fault, given a particular test, to provide a detection function of the particular fault used to determine the ROR value.

15. A non-transitory medium readable by computer, tangibly embodying a program of instructions executable by the computer to perform a method of fault identification for a printing system, the method comprising:
iteratively mapping all real time sensor measurements from all sensors into probabilities of occurrences of faults;
constructing a D-matrix;
implementing a Rate of Return (ROR) that links the probabilities of occurrences of the faults to a priori probabilities of independent faults and a detection function of the ROR to elements of the D-matrix;
determining a ROR value defined as one of: an incremental probability of a particular fault being detected by one more particular test; and the incremental probability of the particular fault being detected by the one more particular test divided by an incremental cost of conducting the one more particular test;
providing a benefit defined as one of: a maximum ROR value, and a sum of maximum ROR values, over all faults, for any fault being detected by the one more particular test;
repeating the prior steps of implementing the ROR, determining the ROR value, and providing the benefit, until one of: a number of tests run, a predetermined accumulation of incremental costs, and a predetermined benefit is reached, and then sending the one more particular test to a scheduler of a printing system controller; and
physically implementing the one more particular test by the printing system, according to the program of instructions by the computer, so as to dynamically reduce a number of tests required to detect a fault in the printing system.

16. The method claim 15, the probabilities of occurrences of the faults representing a probability distribution of a particular test related to at least one sensor, given an occurrence of a particular fault.

17. The method claim 15, further comprising using one of: Process Control Monitoring (PCM) to map real time sensor measurements into a lower dimensional space, and Principal Component Analysis (PCA) to select components that capture a percentage of a total variation of real time sensor measurements, to iteratively map the probabilities of occurrences of the faults.

18. The method of claim 15, the D-matrix comprising matrix elements, where each matrix element contains a probability distribution over disjoint outcomes of a particular test and a particular fault.

19. The method of claim 15, further comprising implementing the ROR by relating the probabilities of occurrences of the faults to a priori probabilities of the faults by one of: logistic regression, linear discriminant analysis, and classification trees.

20. The method of claim 19, further comprising applying Bayes rule to relate matrix elements of the D-matrix to a probability distribution of a particular fault, given a particular test, to provide a detection function of the particular fault used to determine the ROR value.

* * * * *